United States Patent Office 2,973,339
Patented Feb. 28, 1961

2,973,339

LINEAR TEREPHTHALATE POLYESTERS OF ALIPHATIC AND AROMATIC GLYCOLS

Wilhelm Muenster, Ludwigshafen (Rhine), and Erich Dreher and Manfried Paul, Ludwigshafen (Rhine), Oppau, Germany, assignors to Badische Anilin- & Soda-Fabrik Aktiengesellschaft, Ludwigshafen (Rhine), Germany No Drawing. Filed July 3, 1956, Ser. No. 595,606

5 Claims. (Cl. 260—47)

This invention relates to linear polyesters of terephthalic acid and a process of producing them.

It has heretofore been known that by the reaction of terephthalic acid or its esters or of other polyester-forming derivatives with glycols linear polymers of high melting point are formed which can be processed into threads or films. Among the glycols named for this purpose are also those which contain benzene nuclei, as for example hydroquinone, para.para' - dihydroxydiphenyl - dimethylmethane, para.para'-dihydroxydiphenylsulfone and their reaction products with ethylene oxide. These reaction products, however, compare poorly in their properties with those of terephthalic acid with ethylene glycol, especially as regards their melting point, degree of crystallization, ease of spinning and mechanical properties.

It has also been known that generally speaking no particular advantages can be obtained with mixed polyesters.

We have now found, that polyesters of terephthalic acid with ethylene glycol and up to 30 mol percent, preferably 5 to 20 mol percent, with respect to the terephthalic acid, of a glycol which contains one but not more than two benzene nuclei, have a favorable melting temperature, can be well spun and yield spun products, foils and the like having good mechanical properties. Furthermore these mixed polyesters have the advantage of considerably greater capacity for absorbing water and considerably better dyeability.

If more than 30 mol percent of the glycol containing an aryl nucleus is added, a very marked deterioration of the mechanical properties of the polymeric mixed polyester results, the shrinkage by hot water treatment being particularly increased. By keeping the addition at 30 mol percent or less based on the terephthalic acid component the polyesters, it is true, retain a certain tendency to shrinkage but this can be substantially overcome by a previous heat treatment (thermofixing) of the fibres.

It is also surprising that the slightly decreased tendency of the mixed polyesters to crystallize does not in any way unfavorably affect their ease of being spun. The mechanical properties of the spun threads lies in much the same order or magnitude as those of polymeric terephthalic acid ethylene glycol esters. The same products can also be used for the production of foils and moldings which are glass-clear and have a high melting point.

In the practice of our invention the polyesters are prepared by mixing terephthalic acid dimethyl ester with up to 30 mol percent of a glycol which contains one or two benzene nuclei and an excess of ethylene glycol and heating the mixture in the presence of one of the conventional re-esterification catalysts (i.e. for exchange of ester radicals), as for example zinc borate, zinc benzoate, zinc oxide, magnesium stearate, barium oxide or lead oxide, under the usual conditions. Contrary to expectation, when the excess glycol is distilled off, only ethylene glycol occurs in the distillate, i.e. the glycol which contains at least one benzene ring has been completely embodied in the polyester.

The following examples will further illustrate this invention but the invention is not restricted to those examples. The parts specified are parts by weight.

*Example 1*

200 parts of terephthalic acid dimethyl ester are reacted with 40.8 parts (about 20 mol percent) of a reaction product derived from 1 mol of hydroquinone and 2 mols of ethylene oxide (melting point 105° to 106° C.), 200 parts of ethylene glycol and 0.1 part of zinc borate, until methanol no longer distils off. The mixture obtained is then heated in a condenser, away from air, in vacuo at 280° C. until no further distillate passes over and then for another 1½ hours at 280° C., while stirring.

The distillate consists practically exclusively of ethylene glycol. The condensate has a melting point of 212° C., a K-value of 54 and can be spun to threads in a satisfactory manner or processed into foils.

A reaction product prepared in the same way from terephthalic acid dimethyl ester with ethylene glycol alone has the same K-value and a melting point of 265° C.

By using instead of 20 mol percent of the dihydroxyethylated hydroquinone, only 10 mol percent thereof, a polyester is obtained which melts at 239° C. and has about the same K-value.

The dyeability of the threads prepared from this mixed condensate is considerably increased as compared to that of pure polymeric terephthalic acid ethylene glycol ester, the remaining properties lying in the same order of magnitude. The somewhat higher shrinkage can be substantially overcome by previous thermofixing. The properties of the products are shown in the following table in which, column A relates to polyethylene terephthalate; columns B relate to polyethylene terephthalate with dihydroxyethylated hydroquinone

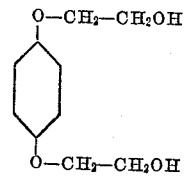

columns C relate to polyethylene terephthalate with dihydroxyethylated para.para'-dihydroxydiphenyl-dimethyl-methane

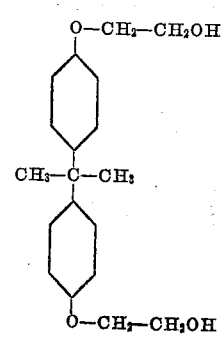

and columns D relate to polyethylene terephthalate with dihydroxyethylated para.para'-dihydroxydiphenyl sulfone

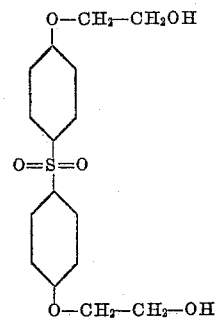

| | A | B | | C | | D | |
|---|---|---|---|---|---|---|---|
| proportion of diol in mol percent | 0 | 10 | 20 | 6.1 | 12.2 | 5.7 | 11.5 |
| proportion of diol in percent by weight | 0 | 10.2 | 20.4 | 10 | 20 | 10 | 20 |
| melting point in °C | 265 | 239 | 212 | 250 | 225 | 245 | 230 |
| elongation at break in percent | 44 | 48 | 46 | 34 | 50 | 44 | 49 |
| K-value | 52 | 55 | 54 | 50 | 51 | 57 | 50 |
| dry tensile strength, grams per denier | 6 | 4.78 | 5.1 | 5.33 | 4.9 | 4.55 | 4.55 |
| relative wet tensile strength in percent | 98 | 98 | 93 | 91 | 91 | 98 | 95 |
| shrinkage at 95 °C.: | | | | | | | |
| (1) without thermofixing in percent | 10.6 | 23 | 33 | 18 | 32 | 18.5 | 26 |
| (2) after thermofixing in percent | 3 | 1 | 15 | 1 | 2.5 | 5 | 8 |
| water absorption in percent | 1 | 2.2 | 2 | 2 | 2 | 2.2 | 2 |

*Example 2*

By replacing the dihydroxyethylated hydroquinone of Example 1 by a reaction product of para.para'-dihydroxydiphenyl-methan with 2 mols of ethylene oxide (melting point 111° C.) in an amount of 12 mol percent, a condensate is obtained which has about the same K-value and a melting point of 225° C. The condensate gives a glass-clear melt and can be excellently spun into threads. These are practically equal as regards elongation at break, dry tensile strength, and relative wet tensile strength to polymeric terephthalic acid ethylene glycol and moreover have a more favorable capacity for absorbing water and a better dyeability. When using the said reaction product in an amount of only 6 mol percent, a condensate is obtained which can be spun very well to threads which also have a considerably better water absorption and dyeability.

*Example 3*

A condensate from terephthalic acid ethylene glycol ester with 6 or 12 mol percent of a reaction product of para.para'-dihydroxydiphenylsulfone and 2 mols of ethylene oxide (melting point 178° C./179° C.) may also be spun to threads which melt at 245° C. or 230° C. and have a considerably better water absorption and dyeability compared to the pure polymeric ethylene glycol ester.

*Example 4*

The same product as in Example 1 is obtained by condensing 200 parts of terephthalic acid dimethyl ester with 200 parts of ethylene glycol and 0.1 part of zinc borate in the usual way until no further methanol distils off, adding to the reaction product 40.8 parts of a reaction product 1 mol of hydroquinone and 2 mols of ethylene oxide, continuing the condensation away from air in vacuo at 280° C. until no further distillate passes over and then heating for 1½ hours at 280° C. while stirring.

What we claim is:

1. A resinous, fusible, fiber-forming linear terephthalate polyester consisting essentially of a terephthalate polyester of 5–30 mol percent, based on the terephthalic acid component of said polyester, of a dihydroxy compound selected from the group consisting of para-di-($\beta$-hydroxy ethoxy) benzene, para,para'-di-($\beta$-hydroxy ethoxy) diphenyl dimethyl methane, and para,para'-di-($\beta$-hydroxy ethoxy) diphenyl sulfone plus 95–70 mol percent, based on the terephthalic acid component of said polyester, of ethylene glycol, said mol percents of said dihydroxy compound and ethylene glycol totaling 100%.

2. A resinous, fusible, fiber-forming linear terephthalate polyester consisting essentially of a terephthalate polyester of 5–20 mol percent based on the terephthalic acid component of said polyester, of para-di-($\beta$-hydroxy ethoxy) benzene plus 95–80 mol percent, based on the terephthalic acid compound of said ester, of ethylene glycol, said mol percents of said para-di-($\beta$-hydroxy ethoxy) benzene plus ethylene glycol totaling 100%.

3. A resinous, fusible, fiber-forming linear terephthalate polyester consisting essentially of a terephthalate polyester of 5–20 mol percent, based on the terephthalic acid component of said polyester, of para,para'-di-($\beta$-hydroxy ethoxy) diphenyl dimethyl methane plus 95–80 mol percent, based on the terephthalic acid component of said ester, of ethylene glycol, said mol percents of said para,para'-di-($\beta$-hydroxy ethoxy) diphenyl dimethyl methane plus ethylene glycol totaling 100%.

4. A resinous, fusible, fiber-forming linear terephthalate polyester consisting essentially of a terephthalate polyester of 5–20 mol percent, based on the terephthalic acid component of said polyester, of para,para'-di-($\beta$-hydroxy ethoxy) diphenyl sulfone plus 95–80 mol percent, based on the terephthalic acid component of said ester, of ethylene glycol, said mol percents of said para,para'-di-($\beta$-hydroxy ethoxy) diphenyl sulfone plus ethylene glycol totaling 100%.

5. A process for the production of resinous, fusible, fiber-forming linear terephthalate polyesters, which comprises heating a mixture consisting of (a) a catalytic amount of a catalyst selected from the group consisting of zinc borate, zinc benzoate, zinc oxide, magnesium stearate, barium oxide, and lead oxide, (b) dimethylterephthalate, (c) 5–30 mol percent, based on the terephthalic acid component in said dimethylterephthalate, of a dihydroxy compound selected from the group consisting of para-di-($\beta$-hydroxy ethoxy) benzene, para,para'-di-($\beta$-hydroxy ethoxy) diphenyl dimethyl methane, and para,para'-di-($\beta$-hydroxyethoxy) diphenyl sulfone, and (d) ethylene glycol in a sufficient quantity to provide component (c) plus component (d) in a stoichiometric excess over the quantity of the terephthalic acid component in said dimethyl terephthalate, said mixture being heated to an ester interchange temperature not higher than 280° C., distilling off during said heating the methanol produced by the ester interchange reaction in said mixture, and then distilling off under vacuum during said heating the excess ethylene glycol in said mixture to obtain a resinous, fusible, fiber-forming linear terephthalic acid polyester of ethylene glycol and substantially all of said dihydroxy compound in said reaction mixture.

References Cited in the file of this patent

UNITED STATES PATENTS

| | | |
|---|---|---|
| 2,437,046 | Rothrock et al. | Mar. 2, 1948 |
| 2,465,319 | Whinfield et al. | Mar. 22, 1949 |
| 2,593,411 | Caldwell | Apr. 22, 1952 |
| 2,595,343 | Drewitt et al. | May 6, 1952 |
| 2,634,251 | Kass | Apr. 7, 1953 |
| 2,762,789 | Fisher et al. | Sept. 11, 1956 |

UNITED STATES PATENT OFFICE
CERTIFICATE OF CORRECTION

Patent No. 2,973,339                      February 28, 1961

Wilhelm Muenster et al.

It is hereby certified that error appears in the above numbered patent requiring correction and that the said Letters Patent should read as corrected below.

In the heading to the printed specification, between lines 9 and 10, insert the following:

Claims priority, Germany application August 11, 1955

Signed and sealed this 3rd day of October 1961.

(SEAL)
Attest:

ERNEST W. SWIDER
Attesting Officer

DAVID L. LADD
Commissioner of Patents
USCOMM-DC